C. W. CURLE.
LINOTYPE SLUG SAWING MACHINE.
APPLICATION FILED DEC. 15, 1917.

1,308,733.

Patented July 1, 1919.
4 SHEETS—SHEET 1.

INVENTOR.
C.W. CURLE.
BY
Carlos P. Griffin
ATTORNEY.

C. W. CURLE.
LINOTYPE SLUG SAWING MACHINE.
APPLICATION FILED DEC. 15, 1917.
1,308,733.
Patented July 1, 1919.
4 SHEETS—SHEET 2.
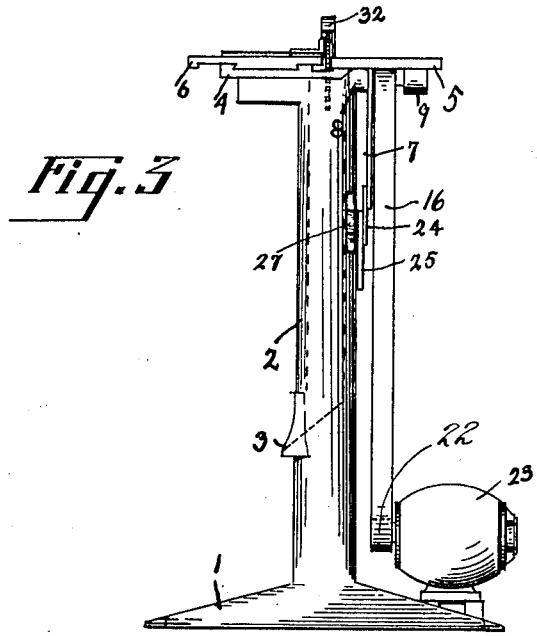
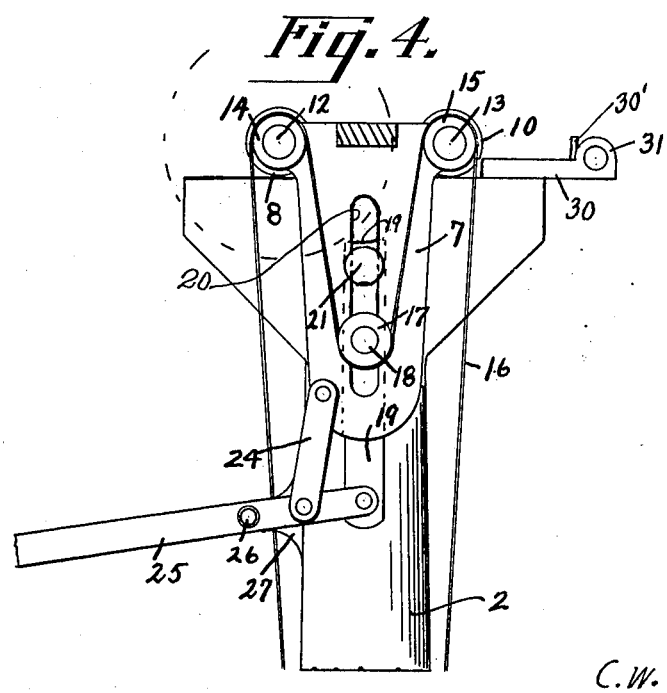
INVENTOR.
C. W. CURLE.
BY
Carlos P. Griffin ATTORNEY.

C. W. CURLE.
LINOTYPE SLUG SAWING MACHINE.
APPLICATION FILED DEC. 15, 1917.
1,308,733.
Patented July 1, 1919.
4 SHEETS—SHEET 3.
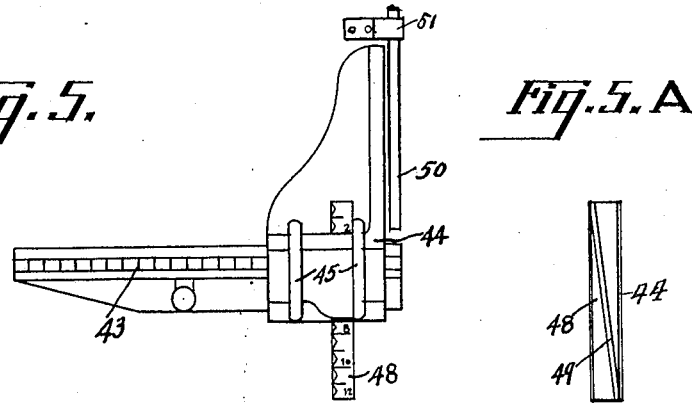
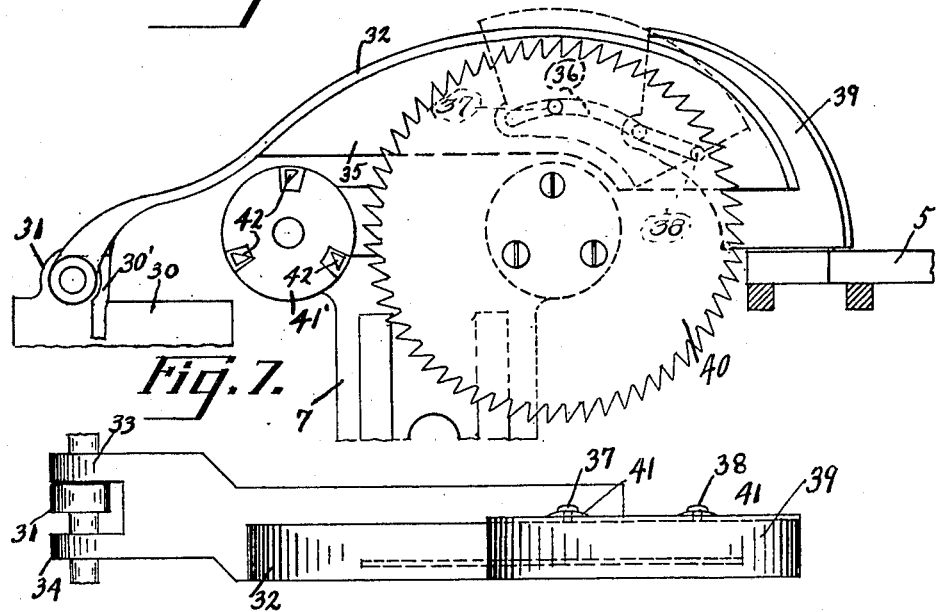
INVENTOR.
C. W. CURLE.
BY Carlos P. Griffin
ATTORNEY.

C. W. CURLE.
LINOTYPE SLUG SAWING MACHINE.
APPLICATION FILED DEC. 15, 1917.
1,308,733.
Patented July 1, 1919.
4 SHEETS—SHEET 4.
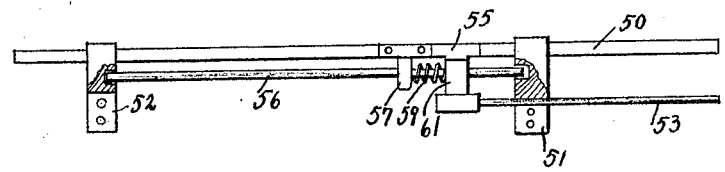
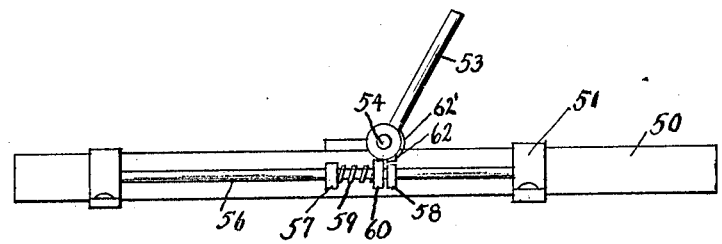
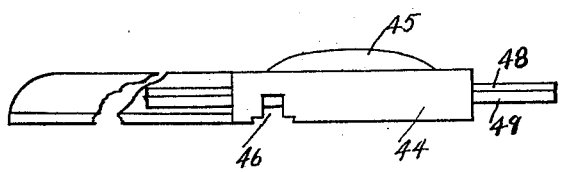 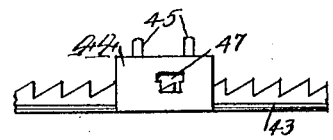
INVENTOR.
C.W. CURLE.
BY
Carlos P. Griffin
ATTORNEY.

UNITED STATES PATENT OFFICE.

CHARLES W. CURLE, OF SAN FRANCISCO, CALIFORNIA.

LINOTYPE-SLUG-SAWING MACHINE.

1,308,733. Specification of Letters Patent. Patented July 1, 1919.

Application filed December 15, 1917. Serial No. 207,243.

*To all whom it may concern:*

Be it known that I, CHARLES W. CURLE, citizen of the United States, residing at San Francisco, in the county of San Francisco, State of California, have invented a new and useful Linotype-Slug-Sawing Machine, of which the following is a specification in such full and clear terms as will enable those skilled in the art to construct and use the same.

This invention relates to a saw for cutting off the ends of linotype slugs, or for cutting off portions of the slugs to prevent them from smudging the paper in printing.

Another object of the invention is to provide a machine for smoothing the slug after it has been cut.

Another object of the invention is to provide means for raising and lowering the saw and smoothing tool without shifting the belt whereby the table on which the slugs are placed will always hold said slugs in the proper position with respect to the position of the cutting tools to do the most effective work.

Other objects of the invention will appear as the description proceeds.

An embodiment of the invention is shown in the drawings in which the same reference numeral is applied to the same portion throughout, but I am aware that there may be modifications thereof within the scope of the appended claims.

Figure 1 is a side elevation of the complete saw table,

Fig. 2 is a plan view of the machine with the saw hood removed, on a slightly larger scale than Fig. 1, Fig. 3 is a front elevation of the machine without the adjustable portion of the saw hood and without the stick for holding the type slugs, Fig. 4 is a side elevation of the top of the post on which the table is mounted showing the slide for carrying the saw and facing cutter, Fig. 5 is a plan view of the detachable stick for holding the type slugs and also showing the ratchet bar and slidable type holding bar in part, Fig. 5A is a bottom plan view of the adjusting slide used to secure the type holding stick in a given adjustment, Fig. 6 is a side elevation of the saw and facing tool showing their relation to the guards thereover, Fig. 7 is a plan view of the saw guards showing the lug supporting them, the saw being indicated in dotted lines, Fig. 8 is a plan view of the slug holding or locking bar and its operating mechanism.

Fig. 9 is a side elevation of the bar shown in 8,

Fig. 10 is a view looking from the left of Fig. 5 showing the slug holding stick detached from the table.

Figure 1:
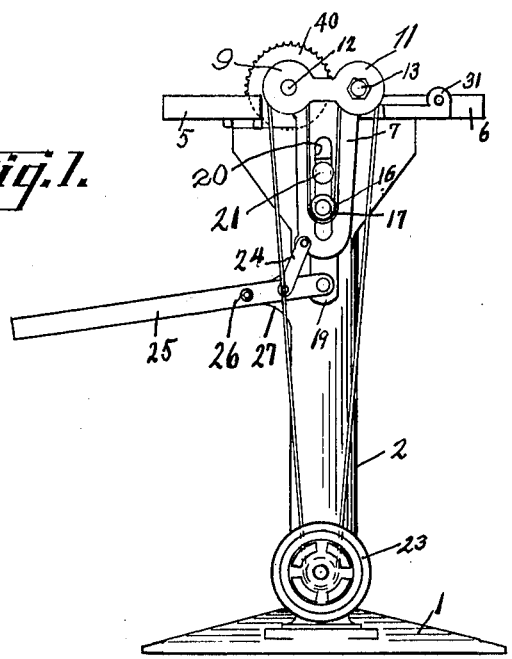
Figure 2:
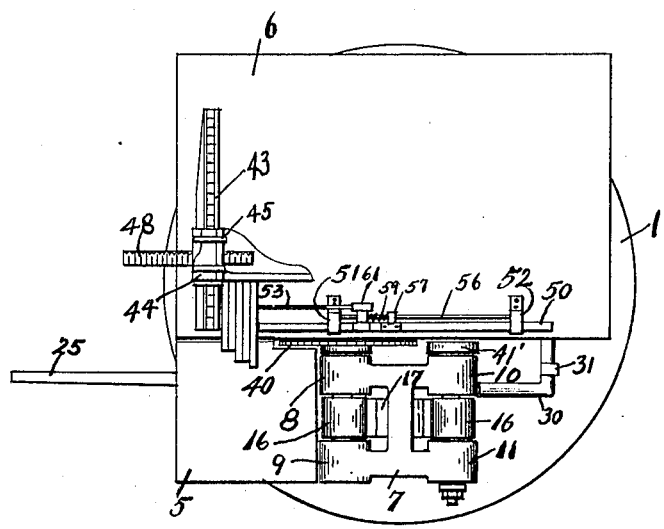

Fig. 11 is a view of the slug holding stick looking from the bottom Fig. 5, and also showing a portion of the rack bar on which it rides, the adjusting slide being removed, The numeral 1 indicates a base, 2 a hollow post having a side discharge chute at 3 for the discharge of the cuttings from the saw. At the top of the post, there is a fixed slide 4, and a fixed table 5 for the convenience of the operator in handling the linotype slugs to be cut off. The slide 4 carries a movable table 6 which may be of such size as is convenient, and which table may be moved from right to left Figs. 1 and 2. At the side of the post, there is a vertically movable slide 7 which slide carries four bearings 8 to 11 at its upper end. The bearings 8 and 9 support a saw and shaft 12, while the bearings 10 and 11 support the facing tool shaft 13. The shaft 12 has a pulley 14, while the shaft 13 has a pulley 15 and a belt 16 passes over both of said pulleys and under a pulley 17 on a short shaft 18 carried by a secondary slide 19 which is movable in the slot 20 of the slide 7. In order to hold the slide 19 straight with respect to the slide 7 it is also provided with a pin 21 which projects through the slot 20 at the upper end thereof. The belt 16 passes under a pulley 22 on the inner end of the shaft of the motor 23, said motor being carried by the base 1. The slide 7 is connected by means of a link 24 to a lever 25. The lever 25 is pivotally mounted at 26 on an arm 27 extending from the post 2. The slide 19 is also connected with the lever 25, but at twice the distance from the pivot point 26, as the connection of said lever with the link 24, so that the pulley 17 will move twice as far as the slide 7 thereby taking up all of the slack of the belt for different positions of the saw and facing tool.

At the back of the facing tool, the post is provided with a rib 30 which has a lug 31 projecting therefrom to support the curved saw guard 32, said guard having ears 33, 34 placed at a distance from each other greater than the width of the lug 31, whereby the guard may be moved laterally to place it as far out of the way of the saw as possible when sawing pieces the guard will not accommodate. At the front the guard has a depending plate 35 which partially covers one side of the saw, and it is slotted at 36 to receive two pins 37, 38 carried by a movable guard piece 39.

Spring washers 41 are placed under the heads of the pins 37, 38, and enable the operator to push the guard 39 up and leave it in any desired position, the friction being sufficient to hold said guard without additional holding means. Since the guard has no means on the front of the table to hold it up off the saw, the post 30' is let into the rib 30 for the guard to rest upon.

The saw is indicated at 40 and the facing tool at 41', which latter has teeth 42 projecting slightly from its surface to enable the operator to face off smoothly the slugs he may be cutting. At the front of the table 6, there is a transversely extending notched bar 43, which bar is suitably secured to the table 6, and which is used for the purpose of holding the slug holding stick 44 in any desired position. The slug holding stick 44 illustrated in Figs. 5, 5ᴬ, 10 and 11 is freely removable from the bar 43, and is provided with two ribs 45, 45 to enable the operator to conveniently hold the stick with his fingers, and it has a groove 46 through which the bar 43 passes, while, at right angles to said groove there is a hole 47 which receives a slide 48. The slide 48 is provided at its underside with a diagonally extending rib 49 which enables the operator to adjust the position of the stick 44 with respect to any one of the notches in the bar 43 as finely as he may desire, the adjustment being accomplished by moving the slide 48 longitudinally with respect to the stick 44. While, if a greater movement is desired, the stick is picked up bodily and moved to another notch.

In operation, a bundle consisting of a number of slugs is gathered by the operator and placed against the stick 44 whereupon he locks the bundle of slugs in a fixed position with respect to the table 6 by means of the slidable bar 50, said bar being slidable in two blocks 51, 52 which are secured to the table 6 adjacent the saw 40. The bar 50 is moved longitudinally by means of a lever 53 which lever is pivoted at 54 in a block 55 secured on the top of the bar 50. At the side of the bar 50 there is a rod 56 which rod has its ends in holes in the block 51, 52, and which also passes through two projecting lugs 57, 58 on the side of the bar 50. Between the two lugs 57, 58 there is a spiral spring 59 surrounding the rod 56 and there is a plate 60 surrounding said rod and held against the lug 58 by the spring 59.

The hub 61 which carries the lever 53 is provided with a cam 62, which cam is adapted to bear against the plate 60 on one side thereof, and to pass over the top of same. Since that plate cannot be pushed along the rod by pushing it on one side only, it will bind on the rod with the result that the plate 50 will be pushed forward each time the lever 53 is pulled down, thereby causing the plate 50 to move forward with a step by step movement until it contacts with the slugs whereupon the cylinderical surface 62' will cause the rod 53 to stay down and thereby hold the slugs tightly against the bar 43 while they are being cut off or trimmed.

The principal advantage of this construction lies in the fact that the table 5 can be stationary, while the table 6 is movable in one direction only, thereby simplifying the construction, and the position of the saw can be changed at will to place it in the most desirable cutting position dependent upon the height of the slugs to be cut, and the belt will always remain tight since the take up pulley 17 moves down twice as far as the slide 7, and since said slide is tight in its guideway and the pull of the belt almost balances, no other means is necessary to prevent the slide from moving from a given adjustment.

Having thus described my invention, what I claim as new and desire to secure by Letters Patent of the United States is as follows, express reservation being made of permissible modifications:

1. A linotype slug sawing machine comprising a support, a slidable table thereon, a circular saw revoluble in a plane adjacent said table, a surfacing tool revoluble in the same plane as the saw, a vertically movable slide carrying the surfacing tool and saw, a belt passing over the drive pulleys of the tool and saw, and manual means for raising or lowering the slide while maintaining the belt tight at all positions of the slide.

2. A linotype slug sawing machine comprising a support, a slidable table thereon, a circular saw and surfacing tool revoluble in a plane adjacent the edge of said table, a vertically movable slide carrying said saw and surfacing tool, a second vertically movable slide carrying a pulley, a belt passing over the drive pulleys of the saw and surfacing tool and under the pulley on the second slide, means to raise and lower the two slides, the second slide being movable through twice the distance of the first slide.

3. A linotype slug sawing machine comprising a support, a slidable table carried thereby, means on the table to lock a set of slugs thereto, a vertically movable slide, a revoluble saw and revoluble facing tool carried thereby, a second slide adjacent the first slide, a pulley carried by the second slide, a belt passing over the pulleys for driving the facing tool and saw and under the pulley on the second slide, and manual means for raising and lowering the two slides, the second slide being raised or lowered twice the distance of the first slide, whereby the belt is always maintained tight.

4. A linotype slug sawing machine comprising a support, a slidable table thereon, a transversely extending notched bar, a stick for holding the slugs in a fixed position on the table, means to adjust said stick comprising a slide having a diagonally extending rib adapted to contact with the notched bar, and means at the side of the table for cutting off the slugs.

5. A linotype slug sawing machine comprising a support, a slidable table carried thereby, a stick for holding a series of linotype slugs on said table, a locking bar for locking said slugs against said stick, said bar being movable longitudinally of the table, and means at the side of the table for cutting off said slugs.

6. A linotype slug sawing machine comprising a support, a slidable table thereon, a slide at the side of the table, a saw carried by said slide, a pair of pulleys carried by said slide, a second slide, a pulley mounted thereon, a belt passing over the first two pulleys, and under the pulley carried by the second slide, a lever for raising and lowering the two slides, the second slide being connected therewith to move through twice the distance of the first slide.

7. A linotype slug sawing machine comprising a support, a slidable table carried thereby, a slide at the side of the table, a revoluble cutting tool carried by said slide, two pulleys carried by the slide, a second slide movable with respect to the first slide, a pulley carried thereby, a belt passing over the first two pulleys and under the pulley on the second slide, a lever having a link connected with the first slide and being connected to the second slide, so that the latter will move twice as far as the first slide.

8. A linotype slug sawing machine comprising a support, a slidable table thereon a saw at the side of the table, a guard thereover, said guard being movable laterally to partially uncover the saw when particular cutting operations are to be effected, and an auxiliary guard at the front of the first guard and movable with respect thereto.

9. A linotype slug sawing machine comprising a support, a slidable table carried thereby, a revoluble saw at the side of the table, means to raise and lower said saw at will, and a laterally movable, pivotally supported, guard over the saw.

In testimony whereof I have hereunto set my hand this 7" day of December, A. D. 1917.

CHARLES W. CURLE.

Copies of this patent may be obtained for five cents each, by addressing the "Commissioner of Patents, Washington, D. C."